US012212032B2

(12) United States Patent
Guo et al.

(10) Patent No.: US 12,212,032 B2
(45) Date of Patent: Jan. 28, 2025

(54) PHASE SHIFTER

(71) Applicants: Beijing BOE Technology Development Co., Ltd., Beijing (CN); BOE Technology Group Co., Ltd., Beijing (CN)

(72) Inventors: Jingwen Guo, Beijing (CN); Qianhong Wu, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/920,681

(22) PCT Filed: Nov. 21, 2021

(86) PCT No.: PCT/CN2021/130382

§ 371 (c)(1),
(2) Date: Oct. 21, 2022

(87) PCT Pub. No.: WO2023/082187

PCT Pub. Date: May 19, 2023

(65) Prior Publication Data

US 2024/0222833 A1 Jul. 4, 2024

(51) Int. Cl.
*H01P 1/20* (2006.01)
*H01P 1/18* (2006.01)
*H01P 1/208* (2006.01)

(52) U.S. Cl.
CPC .............. *H01P 1/2088* (2013.01); *H01P 1/18* (2013.01)

(58) Field of Classification Search
CPC ........... H01P 1/2088; H01P 1/184; H01P 1/18
See application file for complete search history.

(56) References Cited

U.S. PATENT DOCUMENTS

2003/0146079 A1 8/2003 Goldsmith
2003/0146806 A1* 8/2003 Nuecther ................ H01P 1/184 333/156

(Continued)

FOREIGN PATENT DOCUMENTS

CN 101763987 A 6/2010
CN 103746157 A 4/2014

(Continued)

OTHER PUBLICATIONS

Yang Gao, et al. "Optimized Design of 5-bit Distributed MEMS Transmission Line Phase Shifters." MEMS and Sensors. 48(10), pp. 655-659. Oct. 2011. DOI: 10.3969/j.issn.1671-4776.2011.10.00.

*Primary Examiner* — Quan Tra
*Assistant Examiner* — Anh-Quan Tra
(74) *Attorney, Agent, or Firm* — IPro, PLLC

(57) ABSTRACT

A phase shifter includes: a substrate; a first wiring and second wirings that are provided on one side of the substrate, wherein the second wirings are arranged on two opposite sides of the first wiring; at least one electrically conducting bridge, wherein the electrically conducting bridge and the first wiring intersect and are insulated from each other; and a first isolating part, wherein the first isolating part is provided on one side of the first wiring that is close to the electrically conducting bridge, and an orthographic projection on the substrate of a part of the electrically conducting bridge that intersects the first wiring is located within an orthographic projection of the first isolating part on the substrate; and a surface of one side of the first isolating part that is close to the electrically conducting bridge is not even.

20 Claims, 5 Drawing Sheets

(56) References Cited

U.S. PATENT DOCUMENTS

| | | | |
|---|---|---|---|
| 2004/0112723 A1 | 6/2004 | Jung et al. | |
| 2004/0124073 A1 | 7/2004 | Pillans et al. | |
| 2006/0091983 A1 | 5/2006 | Robert | |
| 2010/0001355 A1 | 1/2010 | Peczalski et al. | |
| 2013/0284571 A1 | 10/2013 | Pillans et al. | |
| 2022/0131247 A1* | 4/2022 | Li | H01P 11/00 |
| 2022/0140460 A1 | 5/2022 | Guo et al. | |
| 2022/0302566 A1* | 9/2022 | Guo | H01P 1/182 |

FOREIGN PATENT DOCUMENTS

| | | |
|---|---|---|
| CN | 104170048 A | 11/2014 |
| CN | 114447544 A | 5/2022 |

* cited by examiner

PHASE SHIFTER

TECHNICAL FIELD

The present application relates to the technical field of micro-electro-mechanical systems, and particularly relates to a phase shifter.

BACKGROUND

With the rapid development of the information age, wireless terminals of a high integration degree, a small size, multiple functions and a low cost have gradually become a development trend of communication technology. In the applications of communication and radars, the phase shifter is an indispensable critical component. Traditional phase shifters mainly include ferrite phase shifters and semiconductor phase shifters. Ferrite phase shifters have a high-power capability and a low insertion loss, but factors such as a complicated process, a high manufacturing cost and a huge volume restrict its large-scale application. Semiconductor phase shifters have a low volume and a high operating speed, but they also have a low power capability, a high-power consumption and a high difficulty in the process. Micro-Electro-Mechanical System (MEMS) phase shifters, as compared with the traditional phase shifters, have obvious advantages in terms of the insertion loss, the power consumption, the volume, the cost and so on, and thus have been paid extensive attention in application fields such as radio communication and microwave technique.

SUMMARY

The embodiments of the present application employ the following technical solutions:

In an aspect, there is provided a phase shifter, wherein the phase shifter includes:

a substrate;

a first wiring and second wirings that are provided on one side of the substrate, wherein the second wirings are arranged on two opposite sides of the first wiring, and the first wiring and the second wirings are parallel and are insulated from each other;

at least one electrically conducting bridge, wherein the electrically conducting bridge and the first wiring intersect and are insulated from each other; and two ends of the electrically conducting bridge and the second wirings located on the two sides of the first wiring are lap-joined and are insulated from each other; and a first isolating part, wherein the first isolating part is provided on one side of the first wiring that is close to the electrically conducting bridge, and an orthographic projection on the substrate of a part of the electrically conducting bridge that intersects the first wiring is located within an orthographic projection of the first isolating part on the substrate; and a surface of one side of the first isolating part that is close to the electrically conducting bridge is not even.

Optionally, the first isolating part includes a first isolating unit and a second isolating unit;

a surface of one side of the first isolating unit that is close to the electrically conducting bridge is even, and the second isolating unit is provided on the side of the first isolating unit that is close to the electrically conducting bridge;

the second isolating unit includes a plurality of protrusions that are arranged in an array; and orthographic projections of the plurality of protrusions on the substrate are located within an orthographic projection on the substrate of a part of the electrically conducting bridge that overlaps with the first isolating unit.

Optionally, a shape of a cross section of each of the protrusions in a direction perpendicular to the substrate includes a rectangle, a triangle or a trapezoid.

Optionally, the shape of the protrusion includes a cylinder, a circular cone or a circular truncated cone.

Optionally, a relative dielectric constant of the first isolating unit is greater than a relative dielectric constant of the second isolating unit.

Optionally, the first isolating unit coats two opposite side edges of a part of the first wiring that overlaps with the first isolating unit.

Optionally, a width of the first isolating unit in a first direction is greater than a width of the electrically conducting bridge in the first direction, wherein the first direction is the same as a direction in which the first wiring is provided.

Optionally, the phase shifter further includes: second isolating parts; and the second isolating parts are provided on sides of the second wirings that are close to the electrically conducting bridge, and orthographic projections on the substrate of parts of the electrically conducting bridge that are lap-joined to the second wirings are located within orthographic projections of the second isolating parts on the substrate.

Optionally, the first isolating part includes a first isolating unit and a second isolating unit;

a surface of one side of the first isolating unit that is close to the electrically conducting bridge is even, and the second isolating unit is provided on the side of the first isolating unit that is close to the electrically conducting bridge; and a surface of one side of each of the second isolating parts that is close to the electrically conducting bridge is even, and a thickness of each of the second isolating parts in a direction perpendicular to the substrate and a thickness of the first isolating unit in the direction perpendicular to the substrate are equal.

Optionally, a relative dielectric constant of each of the second isolating parts and a relative dielectric constant of the first isolating unit are equal.

Optionally, each of the first isolating part and the second isolating parts includes a single layer of an isolating material; and a surface of one side of each of the second isolating parts that is close to the electrically conducting bridge is even, and a thickness of each of the second isolating parts in a direction perpendicular to the substrate is equal to a maximum thickness of the first isolating part in the direction perpendicular to the substrate.

Optionally, the maximum thickness of the first isolating part in the direction perpendicular to the substrate ranges from 100 nm to 1000 nm.

Optionally, a relative dielectric constant of each of the second isolating parts and a relative dielectric constant of the first isolating part are equal.

Optionally, the relative dielectric constant of the first isolating part ranges from 3 to 9.

Optionally, the electrically conducting bridge includes a main-body part and lap-joining parts that are provided at two ends of the main-body part;

in the main-body part, a width of a part that intersects the first wiring in a first direction is constant, and a width of a part that does not intersect the first wiring in the first direction is not constant, wherein the first direction is the same as a direction in which the first wiring is provided; and each of the lap-joining parts includes two independent lap-joining ends, and the lap-joining ends contact corresponding second isolating parts.

Optionally, the phase shifter further includes a first controlling unit; and the first controlling unit is electrically connected to the electrically conducting bridge, and is configured to, when the phase shifter is in a phase-shifting state, transmit a driving voltage to the electrically conducting bridge.

Optionally, the phase shifter further includes a second controlling unit; and the second controlling unit is electrically connected to the electrically conducting bridge and the first wiring, and is configured to, when the phase shifter is in a non-phase-shifting state, cause the electrically conducting bridge and the first wiring to be electrically connected, to discharge the electrically conducting bridge.

Optionally, the phase shifter includes a plurality of electrically conducting bridge; and the plurality of electrically conducting bridges are spaced along a first direction, wherein the first direction is the same as a direction in which the first wiring is provided.

Optionally, the plurality of electrically conducting bridges are grouped into a first group and a second group;

each of the first group and the second group includes at least one electrically conducting bridge;

in the first group, all of phase-shifting degrees corresponding to the electrically conducting bridges are equal; and in the second group, all of phase-shifting degrees corresponding to the electrically conducting bridges are unequal.

Optionally, the phase-shifting degrees corresponding to the electrically conducting bridges in the first group are greater than the phase-shifting degrees corresponding to the electrically conducting bridges in the second group.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the prior art, the figures that are required to describe the embodiments or the prior art will be briefly introduced below. Apparently, the figures that are described below are embodiments of the present application, and a person skilled in the art can obtain other figures according to these figures without paying creative work.

DETAILED DESCRIPTION

In order to make the objects, the technical solutions and the advantages of the embodiments of the present application clearer, the technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the embodiments of the present application, terms such as "first" and "second" are used to distinguish identical items or similar items that have substantially the same functions and effects, merely in order to clearly describe the technical solutions of the embodiments of the present application, and should not be construed as indicating or implying the degrees of importance or implicitly indicating the quantity of the specified technical features. Furthermore, the meaning of "plurality of" is "two or more", and the meaning of "at least one" is "one or more", unless explicitly and particularly defined otherwise.

Figure 1:
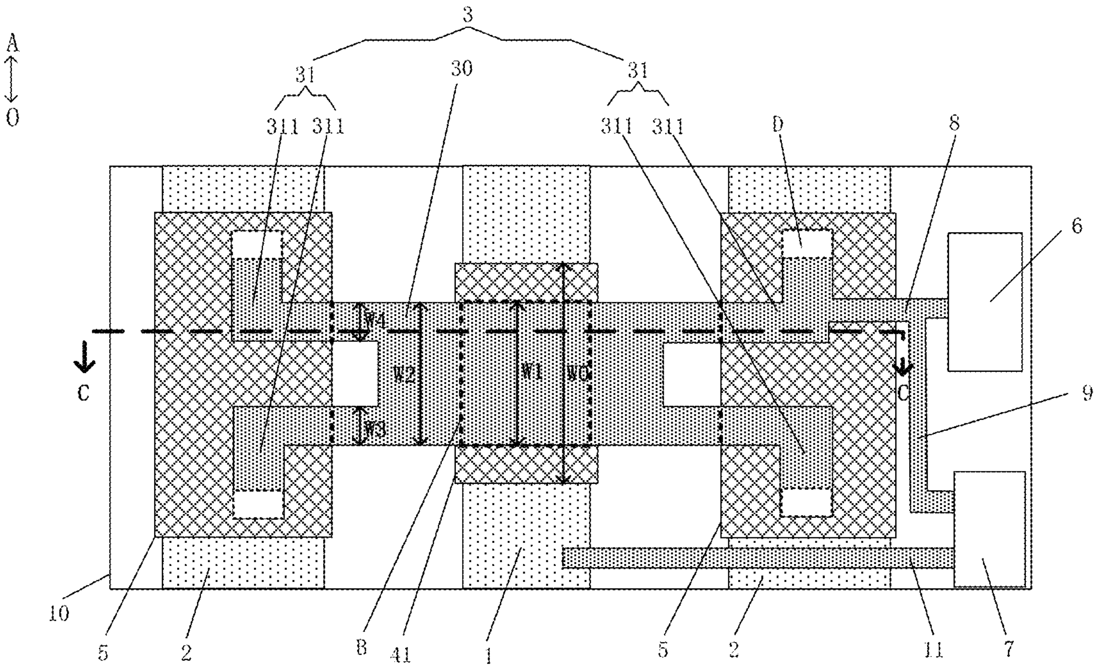
FIG. 1 schematically shows a schematic structural diagram of a phase shifter.
Figure 2:
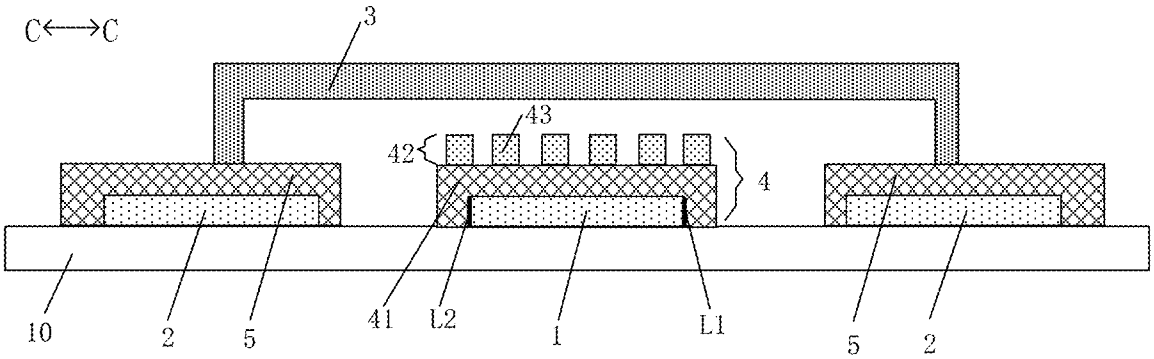
FIG. 2 to FIG. 8 schematically show multiple cross-sectional views in the direction CC in FIG. 1.

An embodiment of the present application provides a phase shifter. Referring to FIGS. 1 and 2, the phase shifter includes:

a substrate 10, wherein the material of the substrate is not limited, and, as an example, may be a rigid material, such as glass;

a first wiring 1 and second wirings 2 that are provided on one side of the substrate 10, wherein the second wirings 2 are arranged on two opposite sides of the first wiring 1, and the first wiring 1 and the second wirings 2 are parallel and are insulated from each other;

at least one electrically conducting bridge 3, wherein the electrically conducting bridge 3 and the first wiring 1 intersect and are insulated from each other; and the two ends of the electrically conducting bridge 3 and the second wirings 2 located on the two sides of the first wiring 1 are lap-joined and are insulated from each other; and a first isolating part 4, wherein the first isolating part 4 is provided on the side of the first wiring 1 that is close to the electrically conducting bridge 3, and the orthographic projection on the substrate of the part of the electrically conducting bridge 3 that intersects the first wiring 1 (the region B defined by the dotted line in FIG. 1) is located within the orthographic projection of the first isolating part 4 on the substrate; and the surface of the side of the first isolating part 4 that is close to the electrically conducting bridge 3 is not even.

It should be noted that the electrically conducting bridge is configured so that, when not electrified, the electrically conducting bridge and the first isolating part have a gap therebetween and do not contact each other, and when electrified, the electrically conducting bridge deforms toward the side close to the first isolating part.

The first wiring may serve as a Coplanar Waveguide (CPW) signal line, and the second wirings may serve as a Coplanar Waveguide ground line. The first wiring and the second wirings cooperate to form a Coplanar Waveguide transmission line. The principle of the phase shifting of the phase shifter is that, when the electrically conducting bridge is not electrified, i.e., not loaded a driving voltage, the electrically conducting bridge and the first isolating part have a gap therebetween and do not contact each other, and a high-frequency signal does not have a phase change when passing through the phase shifter. When the electrically conducting bridge is electrified, i.e., loaded a driving voltage, the electrically conducting bridge deforms toward the side close to the first isolating part by the effect of the electrostatic force. When the driving voltage is sufficiently high, electrostatic force pulls the electrically conducting bridge downwardly to contact the first isolating part. The deformation of the electrically conducting bridge changes the distance between the electrically conducting bridge and the first wiring, thereby changing the distributed capacitance of the Coplanar Waveguide transmission line, whereby the Coplanar Waveguide transmission line becomes a slow-wave system, to achieve phase delay. It should be noted that all of FIGS. 2-5 illustrate by taking the case as an example in which the electrically conducting bridge and the first isolating part have a gap therebetween and do not contact each other.

The second wirings are arranged on two opposite sides of the first wiring. Referring to FIG. 1, here the two opposite sides of the first wiring 1 refer to the left side and the right side of the first wiring 1 on which the second wirings 2 are arranged, and do not refer to the upper side and the lower side of the first wiring 1.

The materials of the first wiring, the second wirings and the electrically conducting bridge are not limited. In order to facilitate the fabrication and reduce the cost, the three of them may employ the same material. As an example, the material of the three of them may be an electrically conductive metal such as aluminum, silver and copper.

The material of the first isolating part is not limited, as long as it can serve to insulate and isolate. By providing the first isolating part between the electrically conducting bridge and the first wiring, failure of signal transmission caused by short circuiting therebetween can be prevented.

That the surface of the side of the first isolating part that is close to the electrically conducting bridge is not even means that the surface of the side of the first isolating part that is close to the electrically conducting bridge is rough and uneven. The particular implementations that the surface of the side of the first isolating part that is close to the electrically conducting bridge is not even are not limited herein. As an example, the uneven surface may be obtained by modes such as surface burr processing, surface wave processing and surface granulation. Alternatively, the uneven surface may also be formed by providing a plurality of protrusions. It should be noted that the above-described unevenness refers to an unevenness generated by changing the structure, for example, by providing protrusions and so on to form an uneven surface, and does not include the unevenness that is caused by the limitation of the practical process conditions and is within the error range of the process.

The particular shape of the electrically conducting bridge is not limited. As an example, the shape of the electrically conducting bridge may be a strip, and may also be another shape.

It should be noted that the electrostatic force is a key factor of the generation of the deformation of the electrically conducting bridge, and the magnitude of the electrostatic force directly influences the degree, of the deformation of the electrically conducting bridge, in turn influences the distance between the electrically conducting bridge and the first wiring, and finally influences the delay amount of the phase. When the electrically conducting bridge is loaded a sufficiently high driving voltage, the electrostatic force pulls the electrically conducting bridge downwardly to the first isolating part. If the surface of the side of the first isolating part that is close to the electrically conducting bridge is very even, then, after the electrically conducting bridge has been pulled downwardly to the first isolating part, the contact area with the first isolating part is large, and, accordingly, by the effect of the electrostatic adsorption, there is a risk that the electrically conducting bridge and the first isolating part adhere each other. Therefore, in the process when the driving voltage is reduced and removed, there is a risk that the electrically conducting bridge is difficult to separate from the first isolating part, which deteriorates the stability of the device.

The phase shifter according to the present application, in an aspect, can perform phase delay to a high-frequency signal. In another aspect, the surface of the side of the first isolating part that is close to the electrically conducting bridge is not even, so, when the electrically conducting bridge is pulled downwardly to the first isolating part, the contact area between the electrically conducting bridge and the first isolating part can be greatly reduced, which effectively reduces the risk of adhesion between the electrically conducting bridge and the first isolating part caused by electrostatic adsorption, thereby improving the stability of the device.

In one or more embodiments, in order to reduce the difficulty in fabrication, referring to FIGS. 2-5, the first isolating part 4 includes a first isolating unit 41 and a second isolating unit 42. The surface of the side of the first isolating unit 41 that is close to the electrically conducting bridge 3 is even, and the second isolating unit 42 is provided on the side of the first isolating unit 41 that is close to the electrically conducting bridge 3.

The second isolating unit 42 includes a plurality of protrusions 43 that are arranged in an array. The orthographic projections of the plurality of protrusions on the substrate are located within the orthographic projection on the substrate of the part of the electrically conducting bridge that overlaps with the first isolating unit.

The first isolating part includes two layers of isolating units. The materials of the first isolating unit and the second isolating unit may be the same or different, and the relative dielectric constant of the first isolating unit and the relative dielectric constant of the second isolating unit may be the same or different, both of which are not limited herein. The particular shape and quantity of the protrusions included in the second isolating unit are not limited.

The surface of the side of the first isolating unit that is close to the electrically conducting bridge is even. Here the evenness includes the unevenness that is caused by the limitation of the practical process conditions and is within the error range of the process.

The second isolating unit includes a plurality of protrusions that are arranged in an array. Therefore, the surface of the side of the first isolating part that is close to the electrically conducting bridge is not even. Such a structure is simple and easy to implement.

Figure 3:
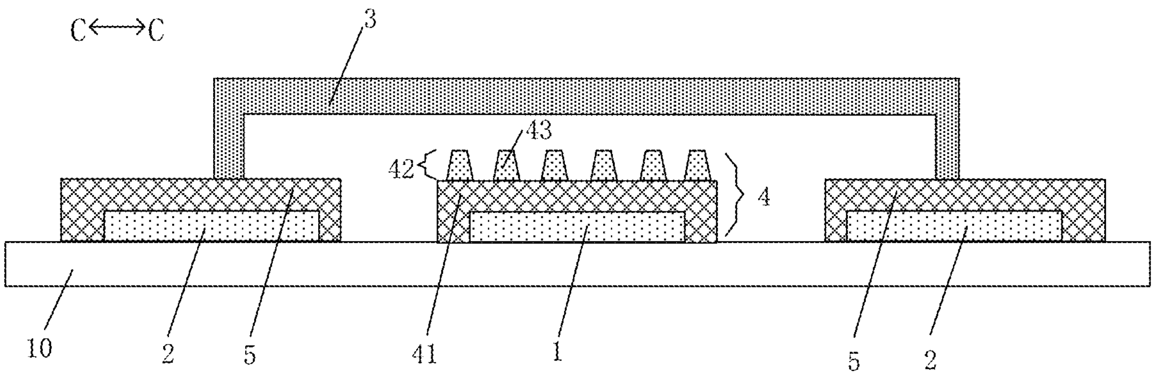
Figure 4:
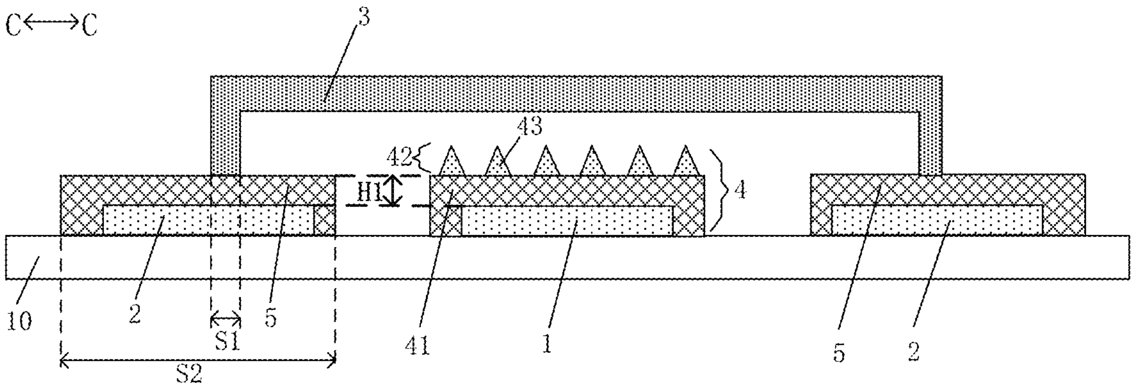

Optionally, in order to facilitate the fabrication and reduce the difficulty in fabrication, the shape of the cross section of each of the protrusions in the direction perpendicular to the substrate includes a rectangle shown in FIG. 2, a triangle shown in FIG. 4 or a trapezoid shown in FIG. 3. Certainly, it may also be other regular shapes, which may be selected according to actual demands.

Optionally, in order to facilitate the fabrication and reduce the difficulty in fabrication, the shape of the protrusion includes a cylinder, a circular cone or a circular truncated cone. In order to further reduce the difficulty in fabrication and the production cost, referring to FIGS. 2-5, the shapes and the sizes of all of the plurality of protrusions 43 are the same.

Optionally, the relative dielectric constant of the first isolating unit is greater than the relative dielectric constant of the second isolating unit. Therefore, the magnitude of the capacitance between the electrically conducting bridge and the first wiring can be regulated, thereby realizing the delay of the corresponding phase.

Optionally, in order to further protect the first wiring, to better prevent short circuiting between the first wiring and the electrically conducting bridge, referring to FIG. 2, the first isolating unit 41 coats two opposite side edges of the part of the first wiring 1 that overlaps with the first isolating unit 41 (the side edge L1 and the side edge L2 shown in FIG. 2).

Optionally, in order to further prevent contacting between the first wiring and the electrically conducting bridge, to prevent short circuiting therebetween, referring to FIG. 1, the width W0 of the first isolating unit 41 in a first direction (the direction AO shown in FIG. 1) is greater than the width W1 of the electrically conducting bridge 3 in the first direction (the direction AO shown in FIG. 1), wherein the first direction (the direction AO shown in FIG. 1) is the same as the direction in which the first wiring 1 is provided.

In one or more embodiments, in order to further prevent contacting between the second wirings and the electrically conducting bridge, to prevent failure of signal transmission caused by short circuiting therebetween, referring to FIGS. 1-5, the phase shifter further includes: second isolating parts 5. The second isolating parts 5 are provided on the sides of the second wirings 2 that are close to the electrically conducting bridge 3, and, referring to FIG. 4, the orthographic projections S1 on the substrate 10 of the parts of the electrically conducting bridge 3 that are lap-joined to the second wirings 2 are located within the orthographic projections S2 of the second isolating parts 5 on the substrate 10.

The material of the second isolating parts is not limited, as long as it can serve to insulate and isolate. The materials of the second isolating parts and the first isolating part may be the same, and may also be different, which is not limited herein. Furthermore, the thicknesses of the second isolating parts and the first isolating part in the direction perpendicular to the substrate may be equal, and may also be unequal. It should be noted that the two ends of the electrically conducting bridge are lap-joined to the second wirings located on the two sides of the first wiring. In the phase shifter provided with the second isolating parts, referring to FIGS. 1-5, the two ends of the electrically conducting bridge 3 may contact and be fixed to the corresponding second isolating parts 5.

A particular structure of the first isolating part and the second isolating parts will be provided below.

Referring to FIGS. 2-5, the first isolating part 4 includes a first isolating unit 41 and a second isolating unit 42. The surface of the side of the first isolating unit 41 that is close to the electrically conducting bridge 3 is even, and the second isolating unit 42 is provided on the side of the first isolating unit 41 that is close to the electrically conducting bridge 3.

The surfaces of the sides of the second isolating parts 5 that are close to the electrically conducting bridge 3 are even, and, referring to FIG. 4, the thickness of each of the second isolating parts 5 in the direction perpendicular to the substrate 10 and the thickness of the first isolating unit 41 in the direction perpendicular to the substrate 10 are equal, both of which are H1.

The materials of the second isolating parts and the first isolating unit may be the same, and may also be different, which is not limited herein. Furthermore, the relative dielectric constants of the second isolating parts and the first isolating unit may be equal, and may also be unequal. In order to simplify the fabricating process and reduce the fabrication cost, the second isolating parts and the first isolating unit may be fabricated by using the same material and by using a one-step patterning process.

The structure of the second isolating unit may, as shown in FIGS. 2-5, include a plurality of protrusions that are arranged in an array, which may particularly refer to the above description, and is not discussed herein further.

In the phase shifter, when the electrically conducting bridge is not electrified, the distance between the electrically conducting bridge and the first isolating part is the distance between the electrically conducting bridge and the second isolating unit. Therefore, by regulating the thickness of the second isolating unit in the direction perpendicular to the substrate, the distance between the electrically conducting bridge and the second isolating unit can be regulated, thereby realizing the phase delay of the corresponding phase-shifting degree, especially a phase delay of a very small phase-shifting degree (for example,) 5.625°. Certainly, the thickness of the first isolating unit in the direction perpendicular to the substrate may be regulated, thereby finally realizing the phase delay of the corresponding phase-shifting degree.

Optionally, in order to simplify the fabricating process, and reduce the fabrication cost, the relative dielectric constant of each of the second isolating parts and the relative dielectric constant of the first isolating unit are equal.

Another particular structure of the first isolating part and the second isolating parts is provided below.

Each of the first isolating part and the second isolating parts includes a single layer of an isolating material. The surface of the side of each of the second isolating parts that is close to the electrically conducting bridge is even, and, referring to FIG. 5, the thickness of each of the second isolating parts 5 in the direction perpendicular to the substrate 10 is equal to the maximum thickness of the first isolating part 4 in the direction perpendicular to the substrate 10, both of which are td.

Figure 5:
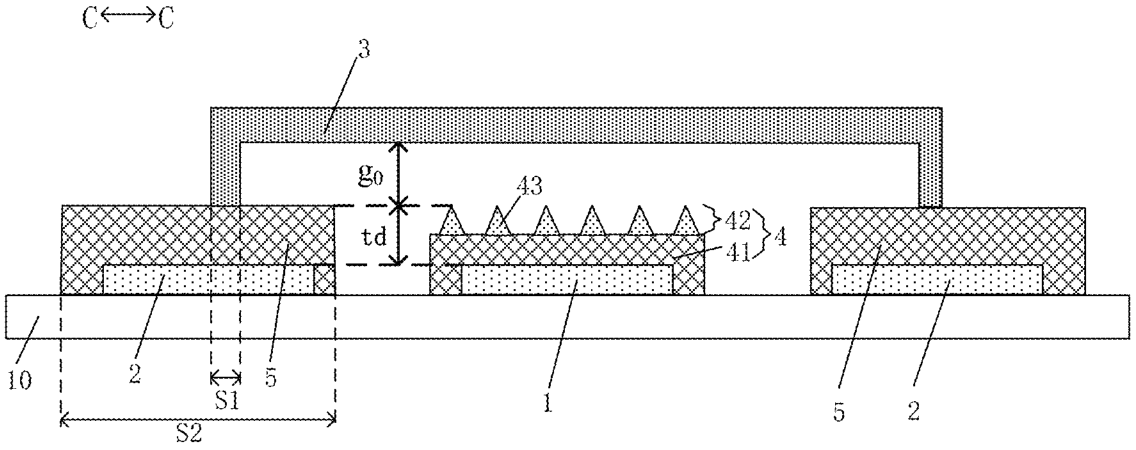

It should be noted that, because the surface of the side of the first isolating part that is close to the electrically conducting bridge is not even, the thickness of the first isolating part in the direction perpendicular to the substrate is not constant, and the maximum thickness shown in FIG. 5 exists.

The surface of the side of the first isolating part that is close to the electrically conducting bridge is uneven. The particular implementation of the uneven surface of the side of the first isolating part that is close to the electrically conducting bridge is not limited herein. As an example, the uneven surface may be obtained by modes such as surface burr processing, surface wave processing and surface granulation. Alternatively, the uneven surface may also be formed by providing a plurality of protrusions.

By regulating the maximum thickness of the first isolating part in the direction perpendicular to the substrate, or regulating the dielectric constant of the first isolating part, phase delays of different phase-shifting degrees can be realized.

Regarding MEMS phase shifters, the switched capacitance ratio Cr is a key parameter that decides the phase-shifting amount of the phase shifter, and the phase-shifting amount of the phase shifter in unit length increases with the increasing of the switched capacitance ratio exponentially. The formula for calculating the switched capacitance ratio Cr is:

$$Cr = \frac{C_d}{C_u} = 1 + \frac{\varepsilon_r g_0}{td}.$$

wherein $C_d$ is the off-state capacitance. In other words, when the electrically conducting bridge is loaded a driving voltage, the electrically conducting bridge deforms toward the side close to the first isolating part by the effect of the electrostatic force. When the driving voltage is sufficiently high, electrostatic force pulls the electrically conducting bridge downwardly to contact the first isolating part. At this point, the off-state capacitance formed by the electrically conducting bridge, the first isolating part and the first wiring is $C_d$. $C_u$ is the on-state capacitance, i.e., the capacitance formed by the electrically conducting bridge, the air gap, the first isolating part and the first wiring when the electrically conducting bridge is not loaded a driving voltage. Er is the relative dielectric constant of the first isolating part. Referring to FIG. 5, $g_0$ is the initial distance between the electrically conducting bridge 3 and the first isolating part 4 (i.e., the distance between them when the electrically conducting bridge is not electrified), and td is the thickness of the first isolating part 4 in the direction perpendicular to the substrate 10.

It can be obtained from the formula of Cr that the switched capacitance ratio Cr is in direct proportion to εr and $g_0$, and is in inverse proportion to td. Therefore, by regulating the relative dielectric constant of the first isolating part, regulating the initial distance between the electrically conducting bridge and the first isolating part, or regulating the thickness of the first isolating part in the direction perpendicular to the substrate, the switched capacitance ratio can be changed, thereby realizing phase delays of different phase-shifting degrees. If the phase-shifting degree is lower, then the phase-shifting precision can be further increased. Therefore, the relative dielectric constant of the first isolating part may be increased, or the initial distance between the electrically conducting bridge and the first isolating part may be increased, or the thickness of the first isolating part in the direction perpendicular to the substrate may be reduced, thereby realizing a low phase-shifting degree, to in turn increase the phase-shifting precision.

Optionally, in order to be compatible with high-level phase shifters and a 45° phase shifter, the maximum thickness of the first isolating part in the direction perpendicular to the substrate ranges from 100 nm to 1000 nm. In this case, the material of the first isolating part may be silicon nitride. Currently the unit phase-shifting degree of a 4-level phase shifter is 22.5°, and the unit phase-shifting degree of a 5-level phase shifter is 11.25°. In order to obtain a low phase-shifting degree, the maximum thickness of the first isolating part in the direction perpendicular to the substrate may range from 200 nm to 600 nm. If the phase shifter is applied to a 4-level phase shifter, the first isolating part may employ silicon nitride, and its maximum thickness in the direction perpendicular to the substrate may be 300 nm.

Figure 13A:
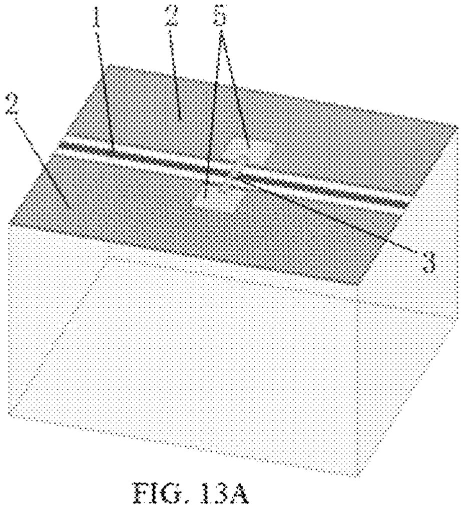
FIG. 13A is a perspective view of a simulated structure.
Figure 13B:
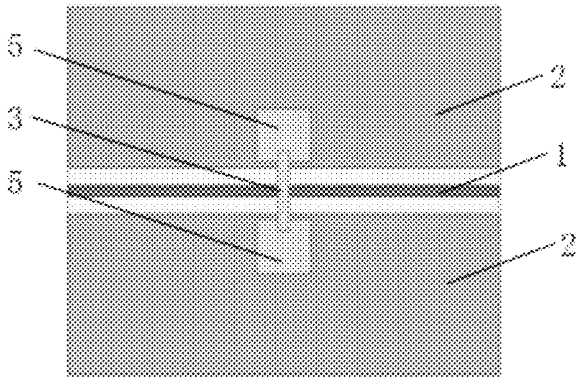
FIG. 13B is a top view of the simulated structure shown in FIG. 13A.

Simulation modeling is performed by using the structure shown in FIG. 13A and FIG. 13B. FIG. 13A is a perspective view, and FIG. 13B is a top view. In such a structure the first isolating part is formed by using silicon nitride of the relative dielectric constant of 7, and when the relative dielectric constant of the first isolating part and the initial distance between the electrically conducting bridge and the first isolating part are constant, by changing the thickness of the first isolating part in the direction perpendicular to the substrate, different phase-shifting degrees are obtained. At the same time, the design of changing the phase-shifting degree by changing the thickness of the first isolating part in the direction perpendicular to the substrate does not have an obvious influence on the driving voltage of the electrically conducting bridge; in other words, a design of different phase-shifting degrees can be realized without increasing the driving voltage.

TABLE 1

| εr | td/nm | h/mm | S11(17.7 GHz)/dB | S21(17.7 GHz)/dB | Cang_deg(17.7 GHz)/dB | Δ/° |
|---|---|---|---|---|---|---|
| 7 | 150 | 0 | −3.75 | −2.65 | −71.19 | |
| | | 0.0014 | −30.49 | −0.10 | −31.41 | 39.78 |
| 7 | 300 | 0 | −7.92 | −0.92 | −54.09 | |
| | | 0.0014 | −29.79 | −0.10 | −31.49 | 22.6 |
| 7 | 450 | 0 | −10.71 | −0.52 | −47.15 | |
| | | 0.0014 | −28.08 | −0.11 | −31.60 | 15.55 |

Referring to Table 1, when the relative dielectric constant of the first isolating part and the initial distance between the electrically conducting bridge and the first isolating part are constant, when the thicknesses of the first isolating part in the direction perpendicular to the substrate are 150 nm, 300 nm and 450 nm, the corresponding phase-shifting degrees are 39.78°, 22.6° and 15.55° respectively. In Table 1, ε is the relative dielectric constant of the first isolating part. h is the distance between the electrically conducting bridge and the first isolating part, S11 represents the return loss, S21 represents the insertion loss, Cang_deg represents the phase, and Δ represents the phase-shifting degree. It should be noted that, in the structure employed by the simulation modeling, the surface of the side of the first isolating part that is close to the electrically conducting bridge is even. The result of the simulation of the phase shifter in which the surface of the side of the first isolating part that is close to the electrically conducting bridge is uneven is similar to that of the above, and is not explained particularly herein.

Optionally, in order to simplify the process, and reduce the fabrication cost, the relative dielectric constant of each of the second isolating parts and the relative dielectric constant of the first isolating part are equal.

Optionally, in order to be compatible with high-level phase shifters and increase the phase-shifting precision, the relative dielectric constant of the first isolating part ranges from 3 to 9. If the phase shifter is applied to a 4-level phase shifter, the first isolating part may employ silicon nitride of the relative dielectric constant of 7, and its maximum thickness in the direction perpendicular to the substrate may be 300 nm.

Simulation modeling is performed by using the structure shown in FIG. 13A and FIG. 13B. In such a structure, the thickness of the first isolating part in the direction perpendicular to the substrate is 300 nm, and when the thickness of the first isolating part in the direction perpendicular to the substrate and the initial distance between the electrically conducting bridge and the first isolating part are constant, by changing the relative dielectric constant of the first isolating part, different phase-shifting degrees are obtained.

TABLE 2

| εr | td/nm | h/mm | S11(17.7 GHz)/dB | S21(17.7 GHz)/dB | Cang_deg(17.7 GHz)/dB | Δ/° |
|---|---|---|---|---|---|---|
| 5 | 300 | 0 | −10.36 | −0.56 | −48.11 | |
| | | 0.0014 | −31.37 | −0.10 | −31.37 | 16.54 |
| 7 | 300 | 0 | −7.92 | −0.92 | −54.09 | |
| | | 0.0014 | −29.79 | −0.10 | −31.49 | 22.6 |
| 9 | 300 | 0 | −28.86 | −1.38 | −59.78 | |
| | | 0.0014 | −6.21 | −0.10 | −31.56 | 28.22 |

Referring to Table 2, when the thickness of the first isolating part in the direction perpendicular to the substrate is 300 nm and the initial distance between the electrically conducting bridge and the first isolating part is constant, when the relative dielectric constants of the first isolating part are 5, 7 and 9, the corresponding phase-shifting degrees are 16.54°, 22.6° and 28.22° respectively. In Table 2, the meanings of the parameters in the columns are the same as those in Table 1, and are not discussed herein further. It should be noted that, in the structure employed by the simulation modeling, the surface of the side of the first isolating part that is close to the electrically conducting bridge is even. The result of the simulation of the phase shifter in which the surface of the side of the first isolating part that is close to the electrically conducting bridge is uneven is similar to that of the above, and is not explained particularly herein. At the same time, the design of changing the phase-shifting degree by changing the relative dielectric constant of the first isolating part does not have an obvious influence on the driving voltage of the electrically conducting bridge; in other words, a design of different phase-shifting degrees can be realized without increasing the driving voltage.

A particular structure of the electrically conducting bridge will be provided below.

In order to realize a better effect of lap joining, and facilitate the downward pulling of the electrically conducting bridge, referring to FIG. 1, the electrically conducting bridge 3 includes a main-body part 30 and lap-joining parts 31 that are provided at the two ends of the main-body part 30.

Referring to FIG. 1, in the main-body part 30, the width W1 of the part that intersects the first wiring 1 (the region B defined by the dotted line in FIG. 1) in a first direction (the direction AO shown in FIG. 1) is constant, and the width of the part that does not intersect the first wiring in the first direction is not constant, wherein the first direction (the direction AO shown in FIG. 1) is the same as the direction in which the first wiring 1 is provided. In FIG. 1, the width of the part of the main-body part 30 that does not intersect the first wiring in the first direction includes W2, W3 and W4.

Referring to FIG. 1, each of the lap-joining parts 31 includes two independent lap-joining ends 311, and the lap-joining ends 311 contact the corresponding second isolating parts 5. Referring to FIG. 1, the parts of the lap-joining ends 311 that contact the second isolating parts 5 are the regions D defined by the dotted lines, and those regions may also be referred to as anchoring-point regions.

In one or more embodiments, in order to better control the driving voltage of the electrically conducting bridge, referring to FIG. 1, the phase shifter further includes a first controlling unit 6. The first controlling unit 6 is electrically connected to the electrically conducting bridge 3, and is configured to, when the phase shifter is in a phase-shifting state, transmit a driving voltage to the electrically conducting bridge.

The structure of the first controlling unit is not limited. As an example, the first controlling unit may include a thin-film transistor (TFT). The thin-film transistor includes a grid, a first electrode and a second electrode. The first electrode may be connected to one end 311 of the electrically conducting bridge 3 via the first wiring 8 shown in FIG. 1. The grid may be accessed to a controlling signal. The second electrode may be accessed to a driving-voltage signal. Accordingly, by the controlling by the controlling signal, the thin-film transistor is turned on, whereby the driving-voltage signal is transmitted to the first controlling unit.

In one or more embodiments, referring to FIG. 1, the phase shifter further includes a second controlling unit 7. The second controlling unit 7 is electrically connected to the electrically conducting bridge 3 and the first wiring 1, and is configured to, when the phase shifter is in a non-phase-shifting state, cause the electrically conducting bridge and the first wiring to be electrically connected, to discharge the electrically conducting bridge. That can prevent the residual electric charges in the electrically conducting bridge from affecting the next time of phase shifting, thereby improving the stability and the accuracy of the phase shifting. Referring to FIG. 1, the second controlling unit 7 may be electrically connected to the electrically conducting bridge 3 via the second wirings 9, and electrically connected to the first wiring 1 via a third wiring 11.

In one or more embodiments, in order to realize phase delay of more phase-shifting degrees, referring to FIGS. 9-12, the phase shifter includes a plurality of electrically conducting bridges 3. The plurality of electrically conducting bridges 3 are spaced along a first direction (the direction OA), wherein the first direction (the direction OA) is the same as the direction in which the first wiring 1 is provided.

The plurality of electrically conducting bridges may correspond to the same one phase-shifting degree. Alternatively, different electrically conducting bridges correspond to different phase-shifting degrees. Alternatively, some of the electrically conducting bridges correspond to the same one phase-shifting degree, and the other electrically conducting bridges correspond to different phase-shifting degrees, which is not limited herein.

An N-level phase shifter may include $2^{N-1}$ electrically conducting bridges. Taking a 5-level phase shifter as an example, referring to FIG. 9, the phase shifter is formed by 31 electrically conducting bridges that are cascaded, and the phase-shifting degree corresponding to each of the electrically conducting bridges is 11.25°. According to the level states of the phase shifter the electrically conducting bridges may be grouped into 5 groups, wherein the level of 11.25° corresponds to 1 electrically conducting bridge, the level of 22.5° corresponds to 2 electrically conducting bridges, the level of 45° corresponds to 4 electrically conducting bridges, the level of 90° corresponds to 8 electrically conducting bridges, and the level of 180° corresponds to 16 electrically conducting bridges, thereby forming 5 MEMS switches (i.e., a 5-level phase shifter). When none of the direct-current bias points 20 of the direct-current-bias-points column of the 5-level phase shifter is accessed to a bias voltage, a high-frequency signal does not have a phase change when passing through the phase shifter. When at least one of the bias points corresponding to the MEMS switches of the level of 22.5°, the level of 45°, the level of 90° and the level of 180° is loaded a bias voltage, the heights of all of the MEMS switches corresponding to the direct-current bias point 20 change, and accordingly the phase of a high-frequency signal correspondingly changes when it is passing through the phase shifter. As an example, when the bias points corresponding to the MEMS switches of the level of 22.5°, the level of 45°, the level of 90° and the level of 180° are loaded a bias voltage, when a high-frequency signal is passing through the phase shifter, the phase is changed by 22.5°, 45°, 90° and 180° respectively. The electrically conducting bridges of each of the groups are connected in parallel. In such a structure, each of the electrically conducting bridges corresponds to one phase-shifting degree. Such a structure requires a high quantity of the electrically conducting bridges, a large device area, and a high production cost.

In order to reduce the quantity of the electrically conducting bridges, the relative dielectric constant of the first isolating part or the maximum thickness of the first isolating part in the direction perpendicular to the substrate may be changed, thereby obtaining different phase-shifting degrees. The relative dielectric constant of the first isolating part may be increased, or the maximum thickness of the first isolating part in the direction perpendicular to the substrate may be reduced, to obtain two types of electrically conducting bridges, wherein the phase-shifting degree corresponding to one type of the electrically conducting bridges is 22.5°, and the phase-shifting degree corresponding to the other type of the electrically conducting bridges is 11.25°. In order to further reduce the quantity of the electrically conducting bridges, referring to FIG. 10, the level of 11.25° corresponds to 1 electrically conducting bridge, the level of 22.5° corresponds to 1 electrically conducting bridge, the level of 45° corresponds to 2 electrically conducting bridges (electrically conducting bridges of the phase-shifting degree of 22.5°), the level of 90° corresponds to 4 electrically conducting bridges (electrically conducting bridges of the phase-shifting degree of 22.5°), and the level of 180° corresponds to 8 electrically conducting bridges (electrically conducting bridges of the phase-shifting degree of 22.5°), thereby forming 5 MEMS switches (i.e., a 5-level phase shifter). The quantity of the electrically conducting bridges of the phase shifter is merely required to be 16, and, as compared with the phase shifter shown in FIG. 9, the quantity of the electrically conducting bridges is reduced from 31 to 16, which greatly reduces the quantity of the electrically conducting bridges, and reduces the device area to at least a half, thereby greatly reducing the cost.

In one or more embodiments, the thickness of the second isolating unit in the direction perpendicular to the substrate may be changed, to obtain three types of electrically conducting bridges, wherein the phase-shifting degree corresponding to the first type of the electrically conducting bridges is 5.625°, the phase-shifting degree corresponding to the second type of the electrically conducting bridges is 11.25°, and the phase-shifting degree corresponding to the third type of the electrically conducting bridges is 22.5°.

Figure 11:
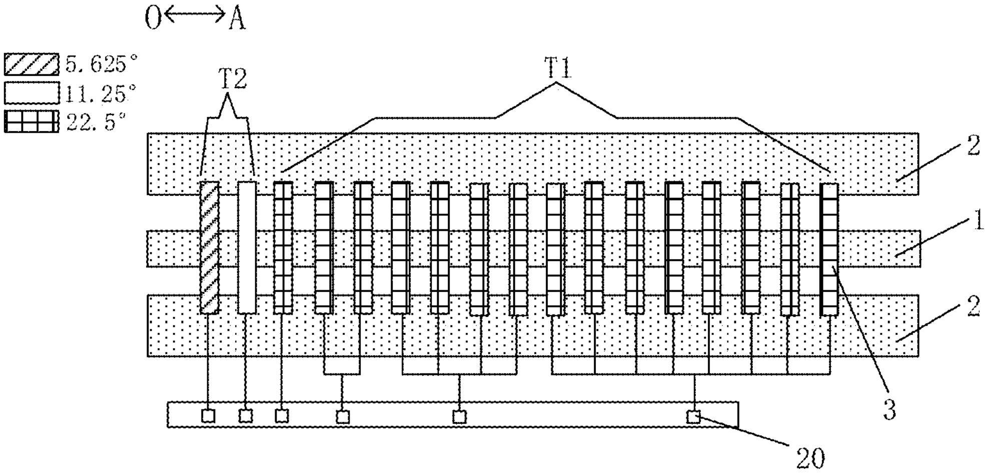

In order to further reduce the quantity of the electrically conducting bridges, referring to FIG. 11, the level of 5.625° corresponds to 1 electrically conducting bridge, the level of 11.25° corresponds to 1 electrically conducting bridge, the level of 22.5° corresponds to 1 electrically conducting bridge, the level of 45° corresponds to 2 electrically conducting bridges (electrically conducting bridges of the phase-shifting degree of 22.5°), the level of 90° corresponds to 4 electrically conducting bridges (electrically conducting bridges of the phase-shifting degree of 22.5°), and the level of 180° corresponds to 8 electrically conducting bridges (electrically conducting bridges of the phase-shifting degree of 22.5°), thereby forming 6 MEMS switches (i.e., a 6-level phase shifter). The quantity of the electrically conducting bridges of the phase shifter is merely required to be 17, and, as compared with the phase shifter shown in FIG. 9, the quantity of the electrically conducting bridges is reduced from 31 to 17, which greatly reduces the quantity and the device area of the electrically conducting bridges, thereby greatly reducing the cost. At the same time, the influence on the driving voltage of the electrically conducting bridges is not obvious; in other words, a design of multiple phase-shifting degrees and a high-precision phase shifting can be realized without changing the driving voltage.

In one or more embodiments, the thickness of the second isolating unit in the direction perpendicular to the substrate may be changed, to obtain four types of electrically conducting bridges, wherein the phase-shifting degree corresponding to the first type of the electrically conducting bridges is 5.625°, the phase-shifting degree corresponding to the second type of the electrically conducting bridges is 11.25°, the phase-shifting degree corresponding to the third type of the electrically conducting bridges is 22.5°, and the phase-shifting degree corresponding to the fourth type of the electrically conducting bridges is 45°.

Figure 12:
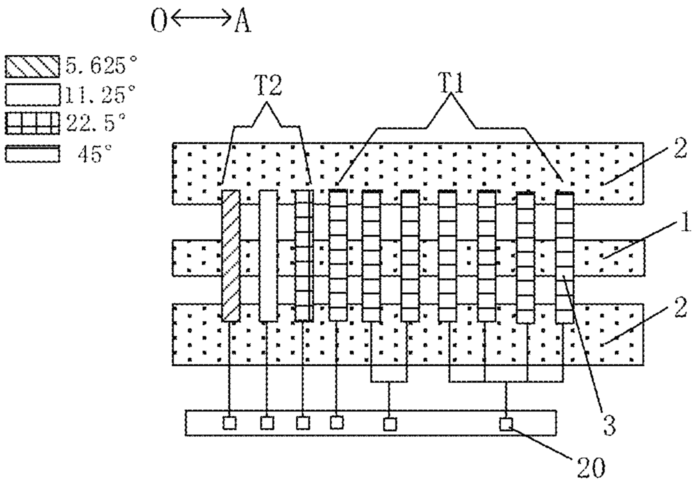

In order to further reduce the quantity of the electrically conducting bridges, referring to FIG. 12, the level of 5.625° corresponds to 1 electrically conducting bridge, the level of 11.25° corresponds to 1 electrically conducting bridge, the level of 22.5° corresponds to 1 electrically conducting bridge, the level of 45° corresponds to 1 electrically conducting bridge, the level of 90° corresponds to 2 electrically conducting bridges (electrically conducting bridges of the phase-shifting degree of 45°), and the level of 180° corresponds to 4 electrically conducting bridges (electrically conducting bridges of the phase-shifting degree of 45°), thereby forming 6 MEMS switches. The quantity of the electrically conducting bridges of the phase shifter is merely required to be 10, and, as compared with the phase shifter shown in FIG. 9, the quantity of the electrically conducting bridges is reduced from 31 to 10, which greatly reduces the quantity and the device area of the electrically conducting bridges, thereby greatly reducing the cost. At the same time, the influence on the driving voltage of the electrically conducting bridges is not obvious; in other words, a design of multiple phase-shifting degrees and a high-precision phase shifting can be realized without changing the driving voltage.

In one or more implementations, when the phase shifter includes a plurality of electrically conducting bridges, referring to FIGS. 9-12, the phase shifter correspondingly includes a plurality of direct-current bias points 20, and the corresponding electrically conducting bridges may be applied a bias voltage via the direct-current bias points.

It should be noted that the reasons why the related MEMS phase shifters cannot realize a high-precision unit design are, in an aspect, the restriction by the accurate controlling on the driving voltage, and, in another aspect, the restriction by the fabrication capacity, as a result of which a smaller electrically conducting bridge cannot be fabricated. The high-precision phase shifter according to the present application has no special requirement on both of them, is more easy to realize mass production, and has a very high value in practical production and application.

Figure 10:
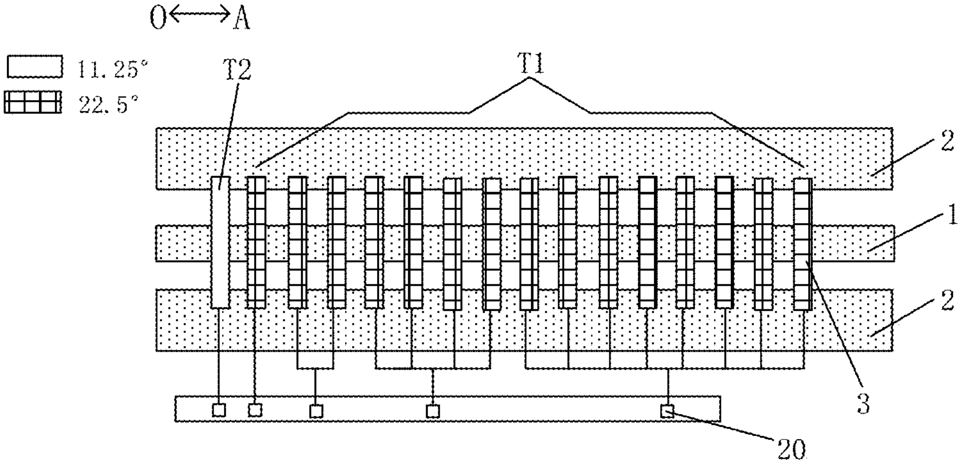

Optionally, referring to FIGS. 10-12, the plurality of electrically conducting bridges are grouped into a first group T1 and a second group T2. Each of the first group and the second group includes at least one electrically conducting bridge. In the first group T1, all of phase-shifting degrees corresponding to the electrically conducting bridges are equal. In the second group T2, all of phase-shifting degrees corresponding to the electrically conducting bridges are unequal.

By changing the thicknesses, the dielectric constants and so on of the first isolating parts, the phase-shifting degrees corresponding to the electrically conducting bridges can be changed.

Further optionally, in order to reduce the quantity of the electrically conducting bridges, the phase-shifting degrees corresponding to the electrically conducting bridges in the first group are greater than the phase-shifting degrees corresponding to the electrically conducting bridges in the second group. As an example, referring to FIG. 11, the phase-shifting degree corresponding to the electrically conducting bridges in the first group T1 is 22.5°, and the phase-shifting degrees corresponding to the electrically conducting bridges in the second group T2 are 5.625° and 11.25°, wherein 22.5° is greater than 5.625°, and greater than 11.25°.

Figure 6:
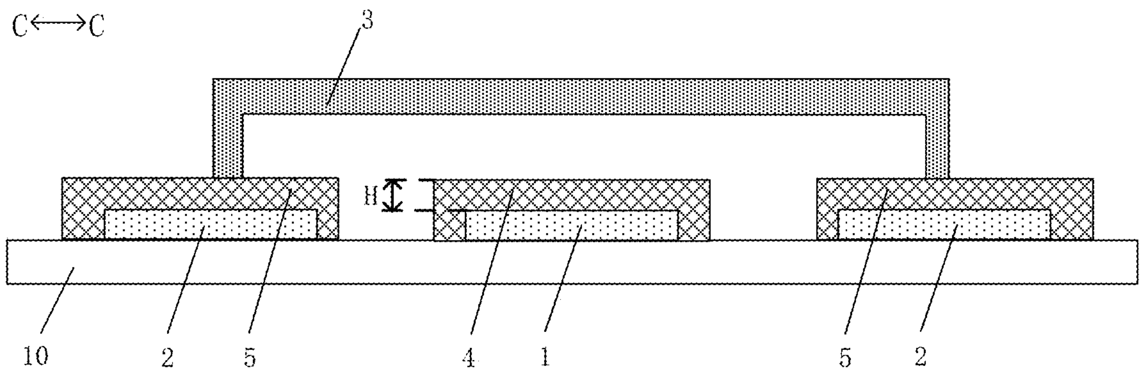
Figure 7:
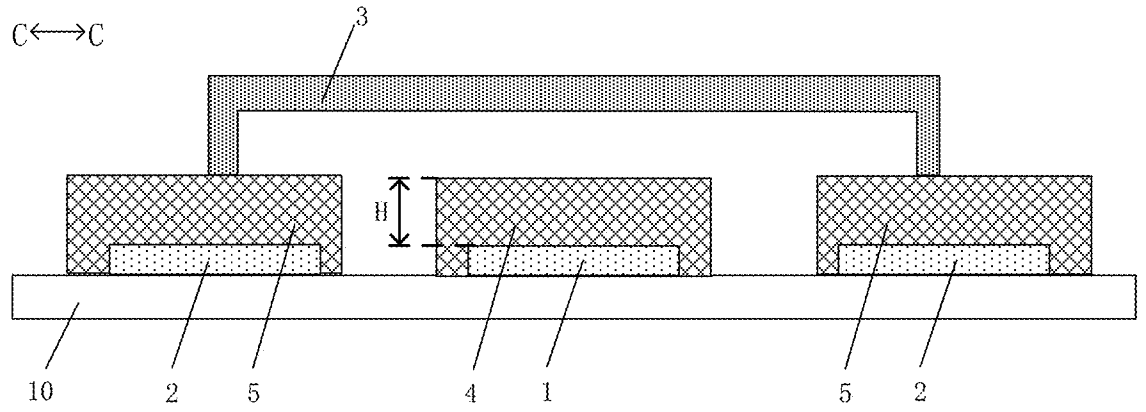
Figure 8:
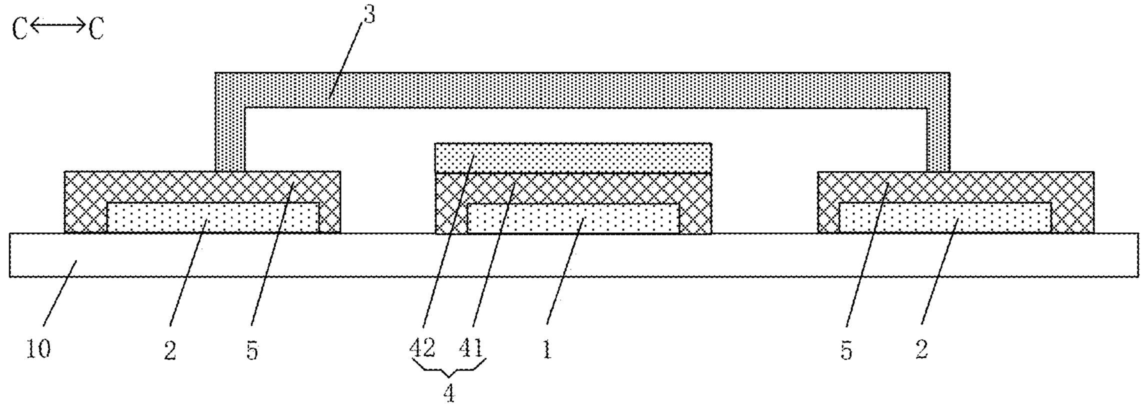
Figure 9:
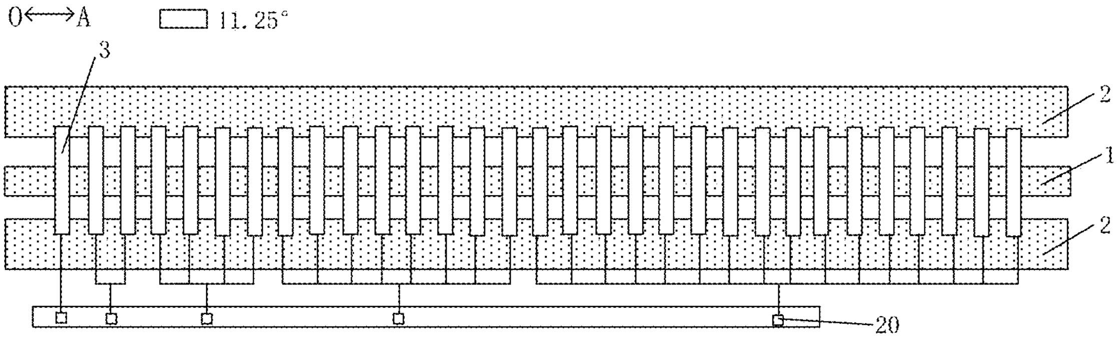
FIG. 9 to FIG. 12 schematically show schematic structural diagrams of multiple phase shifters.

An embodiment of the present application further provides a phase shifter. Referring to FIGS. 6-8, the structure of that phase shifter differs from the phase shifter shown in FIGS. 2-5 in that the surface of the side of the first isolating part 4 that is close to the electrically conducting bridge 3 is even, the thickness of the first isolating part in the direction perpendicular to the substrate may range 100 nm-1000 nm, and its relative dielectric constant may range 3-9. All of the other structures are the same as those of the above-described phase shifter, and are not discussed herein further. The thickness H of the first isolating part 4 in the direction perpendicular to the substrate 10 in FIG. 7 is greater than the thickness H of the first isolating part 4 in the direction perpendicular to the substrate 10 in FIG. 6. In FIGS. 6 and 7, the thickness of the first isolating part 4 in the direction perpendicular to the substrate 10 and the thickness of each of the second isolating parts 5 in the direction perpendicular to the substrate 10 are equal. In FIG. 8, the first isolating part 4 includes a first isolating unit 41 and a second isolating unit 42 that are arranged in stack. As different from the structure of the first isolating part shown in FIGS. 6-8, in FIG. 8 the surface of the side of the second isolating unit 42 that is close to the electrically conducting bridge is even, and the thickness of each of the second isolating parts 5 in the direction perpendicular to the substrate 10 and the thickness of the first isolating unit 41 in the direction perpendicular to the substrate 10 are equal. By regulating the thickness of the first isolating part in the direction perpendicular to the substrate or the relative dielectric constant of the first isolating part, phase delays of different phase-shifting degrees are realized.

The "one embodiment", "an embodiment" or "one or more embodiments" as used herein means that particular features, structures or characteristics described with reference to an embodiment are included in at least one embodiment of the present application. Moreover, it should be noted that here an example using the wording "in an embodiment" does not necessarily refer to the same one embodiment.

The description provided herein describes many concrete details. However, it can be understood that the embodiments of the present application may be implemented without those concrete details. In some of the embodiments, well-known processes, structures and techniques are not described in detail, so as not to affect the understanding of the description.

Finally, it should be noted that the above embodiments are merely intended to explain the technical solutions of the present application, and not to limit them. Although the present application is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A phase shifter, wherein the phase shifter comprises:

a substrate;

a first wiring and second wirings that are provided on one side of the substrate, wherein the second wirings are arranged on two opposite sides of the first wiring, and the first wiring and the second wirings are parallel and are insulated from each other;

at least one electrically conducting bridge, wherein the electrically conducting bridge and the first wiring intersect and are insulated from each other; and two ends of the electrically conducting bridge and the second wirings located on the two sides of the first wiring are lap-joined and are insulated from each other; and a first isolating part, wherein the first isolating part is provided on one side of the first wiring that is close to the electrically conducting bridge, and an orthographic projection on the substrate of a part of the electrically conducting bridge that intersects the first wiring is located within an orthographic projection of the first isolating part on the substrate; and a surface of one side of the first isolating part that is close to the electrically conducting bridge is not even.

2. The phase shifter according to claim 1, wherein the first isolating part comprises a first isolating unit and a second isolating unit;

a surface of one side of the first isolating unit that is close to the electrically conducting bridge is even, and the second isolating unit is provided on the side of the first isolating unit that is close to the electrically conducting bridge;

the second isolating unit comprises a plurality of protrusions that are arranged in an array; and orthographic projections of the plurality of protrusions on the substrate are located within an orthographic projection on the substrate of a part of the electrically conducting bridge that overlaps with the first isolating unit.

3. The phase shifter according to claim 2, wherein a shape of a cross section of each of the protrusions in a direction perpendicular to the substrate comprises a rectangle, a triangle or a trapezoid.

4. The phase shifter according to claim 3, wherein the shape of the protrusion comprises a cylinder, a circular cone or a circular truncated cone.

5. The phase shifter according to claim 2, wherein a relative dielectric constant of the first isolating unit is greater than a relative dielectric constant of the second isolating unit.

6. The phase shifter according to claim 2, wherein the first isolating unit coats two opposite side edges of a part of the first wiring that overlaps with the first isolating unit.

7. The phase shifter according to claim 2, wherein a width of the first isolating unit in a first direction is greater than a width of the electrically conducting bridge in the first direction, wherein the first direction is the same as a direction in which the first wiring is provided.

8. The phase shifter according to claim 1, wherein the phase shifter further comprises: second isolating parts; and the second isolating parts are provided on sides of the second wirings that are close to the electrically conducting bridge, and orthographic projections on the substrate of parts of the electrically conducting bridge that are lap-joined to the second wirings are located within orthographic projections of the second isolating parts on the substrate.

9. The phase shifter according to claim 8, wherein the first isolating part comprises a first isolating unit and a second isolating unit;

a surface of one side of the first isolating unit that is close to the electrically conducting bridge is even, and the second isolating unit is provided on the side of the first isolating unit that is close to the electrically conducting bridge; and a surface of one side of each of the second isolating parts that is close to the electrically conducting bridge is even, and a thickness of each of the second isolating parts in a direction perpendicular to the substrate and a thickness of the first isolating unit in the direction perpendicular to the substrate are equal.

10. The phase shifter according to claim 9, wherein a relative dielectric constant of each of the second isolating parts and a relative dielectric constant of the first isolating unit are equal.

11. The phase shifter according to claim 8, wherein each of the first isolating part and the second isolating parts comprises a single layer of an isolating material; and a surface of one side of each of the second isolating parts that is close to the electrically conducting bridge is even, and a thickness of each of the second isolating parts in a direction perpendicular to the substrate is equal to a maximum thickness of the first isolating part in the direction perpendicular to the substrate.

12. The phase shifter according to claim 11, wherein the maximum thickness of the first isolating part in the direction perpendicular to the substrate ranges from 100 nm to 1000 nm.

13. The phase shifter according to claim 11, wherein a relative dielectric constant of each of the second isolating parts and a relative dielectric constant of the first isolating part are equal.

14. The phase shifter according to claim 13, wherein the relative dielectric constant of the first isolating part ranges from 3 to 9.

15. The phase shifter according to claim 8, wherein the electrically conducting bridge comprises a main-body part and lap-joining parts that are provided at two ends of the main-body part;

in the main-body part, a width of a part that intersects the first wiring in a first direction is constant, and a width of a part that does not intersect the first wiring in the first direction is not constant, wherein the first direction is the same as a direction in which the first wiring is provided; and each of the lap-joining parts comprises two independent lap-joining ends, and the lap-joining ends contact corresponding second isolating parts.

16. The phase shifter according to claim 1, wherein the phase shifter further comprises a first controlling unit; and the first controlling unit is electrically connected to the electrically conducting bridge, and is configured to, when the phase shifter is in a phase-shifting state, transmit a driving voltage to the electrically conducting bridge.

17. The phase shifter according to claim 1, wherein the phase shifter further comprises a second controlling unit; and the second controlling unit is electrically connected to the electrically conducting bridge and the first wiring, and is configured to, when the phase shifter is in a non-phase-shifting state, cause the electrically conducting bridge and the first wiring to be electrically connected, to discharge the electrically conducting bridge.

18. The phase shifter according to claim 1, wherein the phase shifter comprises a plurality of electrically conducting bridge; and the plurality of electrically conducting bridges are spaced along a first direction, wherein the first direction is the same as a direction in which the first wiring is provided.

19. The phase shifter according to claim 18, wherein the plurality of electrically conducting bridges are grouped into a first group and a second group;

each of the first group and the second group comprises at least one electrically conducting bridge;

in the first group, all of phase-shifting degrees corresponding to the electrically conducting bridges are equal; and in the second group, all of phase-shifting degrees corresponding to the electrically conducting bridges are unequal.

20. The phase shifter according to claim 19, wherein the phase-shifting degrees corresponding to the electrically conducting bridges in the first group are greater than the phase-shifting degrees corresponding to the electrically conducting bridges in the second group.

* * * * *